United States Patent [19]

Harada et al.

[11] 4,153,333
[45] May 8, 1979

[54] OPTICAL FIBER BUNDLE WITH FIELD STOP

[75] Inventors: Yuho Harada; Kenzo Hiramatu; Katsuhito Hasegawa; Kuniaki Ishibashi, all of Omiya, Japan

[73] Assignee: Fuji Photo Optical Co., Ltd., Omiya, Japan

[21] Appl. No.: 771,348

[22] Filed: Feb. 23, 1977

[30] Foreign Application Priority Data

Feb. 23, 1976 [JP] Japan .................................. 51-18610

[51] Int. Cl.$^2$ .............................................. G02B 5/17
[52] U.S. Cl. ............................... 350/96.25; 350/96.26
[58] Field of Search ............... 350/96 B, 96 BC, 96.24, 350/96.25, 96.26, 96.27

[56] References Cited

U.S. PATENT DOCUMENTS

| | | | |
|---|---|---|---|
| 3,068,745 | 12/1962 | Peck | 350/96 B |
| 3,283,651 | 11/1966 | King et al. | 350/96 B UX |
| 3,327,712 | 6/1967 | Kaufman et al. | 350/96 B |
| 3,442,583 | 5/1969 | Rottmann | 350/96 BC X |
| 3,936,149 | 2/1976 | Imai | 350/206 X |

FOREIGN PATENT DOCUMENTS 2316732  10/1973  Fed. Rep. of Germany ......... 350/96 B

*Primary Examiner*—John K. Corbin
*Assistant Examiner*—John D. Lee
*Attorney, Agent, or Firm*—Harold L. Stults; Pasquale A. Razzano

[57] ABSTRACT

An image transmitting optical fiber bundle has at an end of it a field stop for defining the size of image viewed thereby. The field stop is sandwiched between a pair of transparent thin plastic films. The pair of films which sandwiches the field stop is fixed to an end of the optical fiber bundle. A face plate is further fixed on the pair of films on the end face of the fiber bundle. Since the surfaces adhered are all flat, the formation of bubbles in the adhesive is easily precluded.

3 Claims, 2 Drawing Figures

OPTICAL FIBER BUNDLE WITH FIELD STOP

BACKGROUND OF THE INVENTION

1. Field of the Invention

This invention relates to an optical fiber bundle, and more particularly to an improvement in the structure of an end face of an image transmitting optical fiber bundle (hereinafter referred to simply as "image guide").

2. Description of the Prior Art

In the image guide composed of a number of thin optical fibers stacked in a close-packed structure, the outer fibers on the periphery of the image guide are liable to slack and the arrangement of the fibers is apt to be disordered. Particularly, in image guides which are combined with an optical system used for enlarging an image, the disordered arrangement of the fibers is also enlarged, which results in degradation in image quality. In order to evade this problem, it has been generally known to provide a field stop between the end of the image guide and an eyepiece.

In the image guide practically manufactured, the end face of the image guide is precise finished to make an optically flat end face. In order to prevent the finished end from staining, weathering or dimming, a face plate is generally cemented to the finished end of the image guide. Therefore, in the conventional image guide, the face plate is fixed directly to the end of the image guide and thereon is mounted a field stop to provide a mask on the image obtained by the image guide. An eyepiece is then provided on the field stop.

The above described conventional image guide has a defect in that the effective aperture size of the field stop is changed as the position of the pupil is moved along the optical axis of the eyepiece, since the field stop is separated from the end face of the image guide. When a picture of the image viewed through the image guide is taken, the marginal boundary of the image defined by the field stop is apt to be blurred.

If the field stop would be inserted between the eyepiece and the end face of the image guide in order to preclude the above described defect caused by the distance made therebetween, there would occur the following problems. When the field stop is fixed to the end face of the image guide, an adhesive is used. In this case, it is very difficult to remove bubbles contained in the adhesive. The bubbles in the adhesive will accelerate the staining, weathering or dimming of the end face of the image guide. Since the inner edge of the field stop which has a substantial thickness works to accelerate the formation of the bubbles when the field stop is pressed against the end face of the image guide with the adhesive sandwiched therebetween, the removal of the bubbles is considerably difficult. When the bubbles are fixedly formed in the adhesive, it would become necessary to remove the field stop from the end face to again polish the end face.

SUMMARY OF THE INVENTION

In view of the above defects, it is the primary object of the present invention to provide an image guide in which a field stop is fixed to the end face thereof at substantially the same position on the optical axis of the eyepiece as that of the end face, whereby the change of the effective aperture size of the field stop is prevented.

It is another object of the present invention to provide an image guide in which the formation of bubbles in the adhesive when a field stop is fixed to the end face of the image guide is effectively prevented.

It is still another object of the present invention to provide an image guide in which a thick face plate can be used at the end thereof, whereby the degradation of image quality caused by dusts or stains on the surface of the face plate is prevented.

The above objects are accomplished by providing a field stop sandwiching means which sandwiches a field stop therebetween between the end face of the image guide and the face plate. The sandwiching means is composed a pair of thin plastic films. Since the field stop is first sandwiched between the pair of thin plastic films and then the plastic films are attached to the end face of the image guide, there is no fear of forming bubbles in the adhesive used between the plastic film and the end face of the image guide.

The present invention will be described in more detail with reference to the accompanying drawing.

DESCRIPTION OF THE PREFERRED EMBODIMENT

Figure 1:
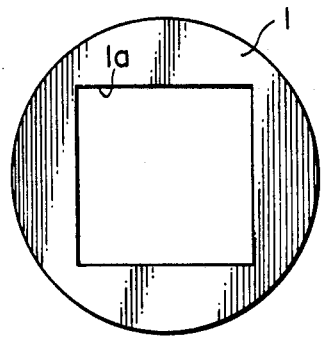
FIG. 1 is plan view of a field stop used in the image guide in accordance with the present invention.

FIG. 1 shows a field stop 1 employed in the image guide in accordance with the present invention. The field stop 1 has a square aperture 1a. The field stop is sandwiched between a pair of thin transparent plastic films 2a and 2b as shown in FIG. 2 and fixed thereto by means of an adhesive.

Since the field stop 1 is fixed to the films 2a and 2b separately from the image guide 5, the bubbles if formed in the adhesive can be removed by vacuum deforming. Further, if the bubbles are not completely removed in some assemblies consisting of the field stop 1 and the films 2a and 2b, the image guides may be manufactured without using those assemblies containing bubbles.

Figure 2:
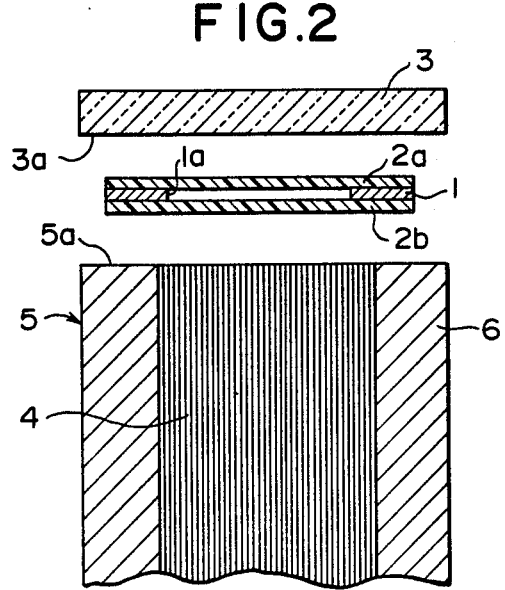
FIG. 2 is an exploded longitudinal sectional view showing the end of the image guide in accordance with the present invention.

Referring to FIG. 2, a stack of optical fibers 4 is sealed in a sleeve 6. The end of the sleeve 6 and the end of the fibers 4 are polished precisely to provide a flat face 5a to which said assembly is attached. The assembly consisting of the pair of plastic films 2a and 2b and the field stop 1 fixed therebetween is adhered to the end face 5a of the image guide 5. Since the surface of the film 2b is flat, the assembly can easily be fixed to the end face 5a of the image guide by means of an adhesive without forming bubbles therein. On the assembly fixed to the end face 5a of the image guide, a face plate 3 is adhered to the surface of the film 2a by an adhesive. Since the surfaces of the film 2a and the face plate 3 are also flat, the face plate 3 can easily be fixed to the assembly without forming bubbles in the adhesive. Thus, an image guide free from the fear of staining, weathering or dimming on the end face thereof can be obtained.

We claim:

1. In an optical fiber bundle comprising a stack of optical fibers an end of which is precisely polished to provide a flat end face, a face plate having a flat surface and made of transparent material fixed to said end face of the optical fibers, and a field stop fixed between said end face of the optical fibers and said face plate, the improvement which comprises a pair of transparent films sandwiching said field stop therebetween and fixed to said field stop by means of an adhesive, one of said pair of transparent films being fixed between said end face of the optical fibers and said field stop by means of an adhesive.

2. An optical fiber bundle as defined in claim 1 wherein said end of the optical fibers is sealed in a rigid sleeve, and the end face of the optical fibers and the end face of the rigid sleeve are polished together to provide a flat end face on which said pair of transparent films sandwiching said field stop is fixed.

3. An optical fiber bundle comprising a stack of optical fibers an end of which is precisely polished to provide a flat end face, a face plate having a flat surface and made of transparent material, and a field stop having one side fixed to said flat surface of said face plate, the improvement which comprises a film fixed by adhesive to the other side of said field stop and fixed to said flat end face of said optical fibers by adhesive whereby the formation of bubbles at the ends of said optical fibers is prevented and said face plate is rigidly attached to said field stop.

* * * * *